United States Patent
Dhanwada et al.

(10) Patent No.: US 10,204,198 B2
(45) Date of Patent: Feb. 12, 2019

(54) METHOD FOR EFFICIENT LOCALIZED SELF-HEATING ANALYSIS USING LOCATION BASED DELTAT ANALYSIS

(71) Applicant: International Business Machines Corporation, Armonk, NY (US)

(72) Inventors: Nagashyamala R. Dhanwada, Tenafly, NJ (US); Arun Joseph, Bangalore (IN); Arya Madhusoodanan, Bangalore (IN); Spandana V. Rachamalla, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

(21) Appl. No.: 15/410,929

(22) Filed: Jan. 20, 2017

(65) Prior Publication Data

US 2018/0210989 A1 Jul. 26, 2018

(51) Int. Cl.
G06F 17/50 (2006.01)

(52) U.S. Cl.
CPC ...... *G06F 17/5036* (2013.01); *G06F 2217/78* (2013.01); *G06F 2217/80* (2013.01)

(58) Field of Classification Search
USPC ......................................................... 716/109
See application file for complete search history.

(56) References Cited

U.S. PATENT DOCUMENTS

| | | |
|---|---|---|
| 2013/0298101 A1 | 11/2013 | Chandra |
| 2014/0317389 A1* | 10/2014 | Wenisch ................. G06F 1/20 712/229 |
| 2016/0048622 A1* | 2/2016 | Jeon .................... G06F 17/5036 703/14 |
| 2016/0178705 A1 | 6/2016 | Stirk et al. |
| 2016/0203246 A1* | 7/2016 | Chiou ................. G06F 17/5009 716/136 |
| 2016/0266196 A1 | 9/2016 | Jenkins et al. |
| 2016/0378897 A1 | 12/2016 | Anderson et al. |

OTHER PUBLICATIONS

Dhanwada, et al., "Method for Efficient Localized Self-Heating Analysis Using Location Based Deltat Analysis"; U.S. Appl. No. 15/792,820, filed Oct. 25, 2017.
List of IBM Patents or Patent Applications Treated As Related; (Appendix P), Date Filed Oct. 25, 2017; 2 pages.

* cited by examiner

*Primary Examiner* — Bryce M Aisaka
(74) *Attorney, Agent, or Firm* — Cantor Colburn LLP; Steven Meyers

(57) ABSTRACT

Aspects of the present invention include a method, system and computer program product that provides for improved localized self-heating analysis during IC design. The method includes a processor for modeling a power characteristic and a thermal resistance characteristic for each one of a plurality of locations within a cell that is being designed into an integrated circuit; for performing a self-heating analysis to determine an amount of heat at each one of the plurality of locations within the cell; and for creating a thermal profile for the cell, wherein the thermal profile includes a maximum self-heating value for each of the plurality of locations within the cell and includes an average self-heating value for the cell, and wherein the maximum self-heating value and the average self-heating value are derived from the determined amount of heat at each one of the plurality of locations within the cell.

11 Claims, 8 Drawing Sheets

METHOD FOR EFFICIENT LOCALIZED SELF-HEATING ANALYSIS USING LOCATION BASED DELTAT ANALYSIS

BACKGROUND

The present invention relates to the design of integrated circuits (ICs), and more specifically, to a method, system and computer program product that provides for improved localized self-heating analysis during IC design primarily at the gate level.

In the normal operation of ICs, it is known that the switching of transistors designed into the IC consumes electrical power, which generates heat that causes a rise in the temperature at various locations ("hot spots") within the IC. This is commonly known as self-heating or DeltaT (i.e., temperature change).

Transistors are one of the basic building blocks of design elements or cells (e.g., an inverter, a NAND gate, a latch, etc.) within a typical IC. A single cell may comprise a relatively large number of transistors and other building blocks (e.g., resistors, capacitors, etc.), depending on the specific functionality of that type of cell. A designer of an IC typically may have a library of hundreds or even a thousand or more cells from which to choose when designing the various macro functions of a particular IC.

The increased temperature of the IC at certain locations may impact and/or cause, for example, leakage currents, circuit delays, circuit functionality, and both front end of the line (FEOL) and back end of the line (BEOL) IC fabrication reliability. Thus, it is desirable when designing an IC to perform an analysis of the progressing IC design to accurately identify localized hot spots in the design and revise the IC design to correct for these hot spots (i.e., to better dissipate the heat through the various devices formed in the IC along with the wires and substrate).

What is needed is an improved method for analysis of localized self-heating within an IC during the gate design phase, wherein the analysis accurately captures the heterogeneity of the self-heating or DeltaT within a cell of the IC in a relatively rapid and efficient "in-context" manner and relatively early in the IC gate level design flow process.

SUMMARY

According to one or more embodiments of the present invention, a computer-implemented method of fabricating a semiconductor device includes modeling, by a processor, a power characteristic and a thermal resistance characteristic for each one of a plurality of locations within a cell that is being designed into an integrated circuit; performing, by the processor, a self-heating analysis to determine an amount of heat at each one of the plurality of locations within the cell that is being designed into the integrated circuit; and for creating, by the processor, a thermal profile for the cell that is being designed into the integrated circuit, wherein the thermal profile includes a maximum self-heating value for each of the plurality of locations within the cell that is being designed into the integrated circuit and includes an average self-heating value for the cell that is being designed into the integrated circuit, and wherein the maximum self-heating value and the average self-heating value are derived from the determined amount of heat at each one of the plurality of locations within the cell.

According to another embodiment of the present invention, a system includes a processor in communication with one or more types of memory, the processor configured to perform a method of fabricating a semiconductor device in which the processor is configured to model a power characteristic and a thermal resistance characteristic for each one of a plurality of locations within a cell that is being designed into an integrated circuit; to perform a self-heating analysis to determine an amount of heat at each one of the plurality of locations within the cell that is being designed into the integrated circuit; and to create a thermal profile for the cell that is being designed into the integrated circuit, wherein the thermal profile includes a maximum self-heating value for each of the plurality of locations within the cell that is being designed into the integrated circuit and includes an average self-heating value for the cell that is being designed into the integrated circuit, and wherein the maximum self-heating value and the average self-heating value are derived from the determined amount of heat at each one of the plurality of locations within the cell.

According to yet another embodiment of the present invention, a computer program product includes a storage medium readable by a processing circuit and storing instructions for execution by the processing circuit for performing a method of fabricating a semiconductor device that includes modeling a power characteristic and a thermal resistance characteristic for each one of a plurality of locations within a cell that is being designed into an integrated circuit; performing a self-heating analysis to determine an amount of heat at each one of the plurality of locations within the cell that is being designed into the integrated circuit; and creating a thermal profile for the cell that is being designed into the integrated circuit, wherein the thermal profile includes a maximum self-heating value for each of the plurality of locations within the cell that is being designed into the integrated circuit and includes an average self-heating value for the cell that is being designed into the integrated circuit, and wherein the maximum self-heating value and the average self-heating value are derived from the determined amount of heat at each one of the plurality of locations within the cell.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
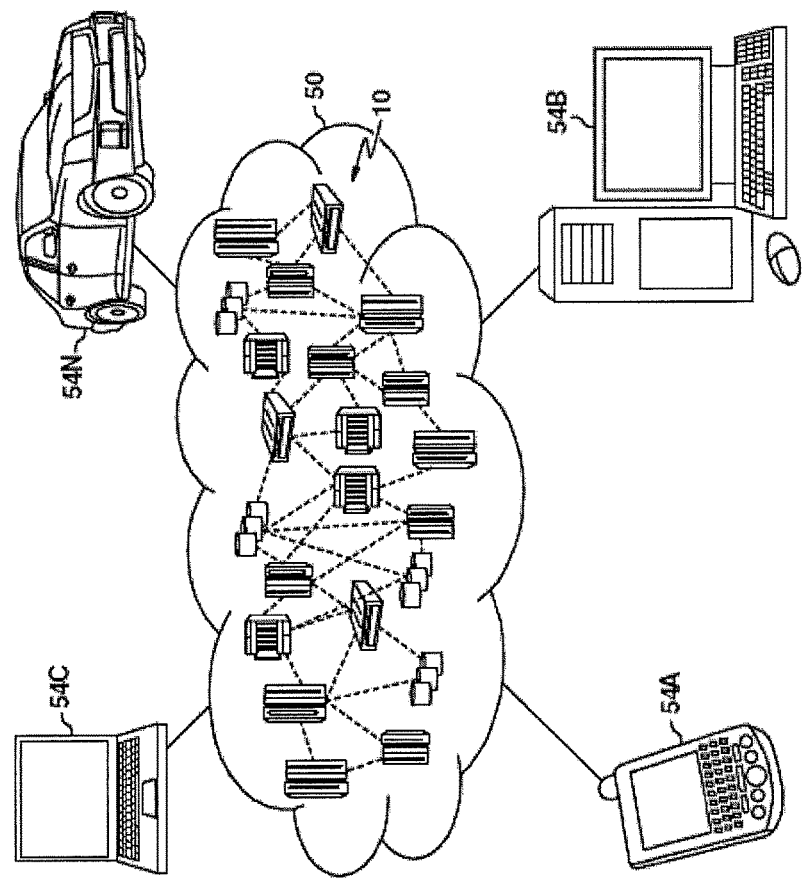
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
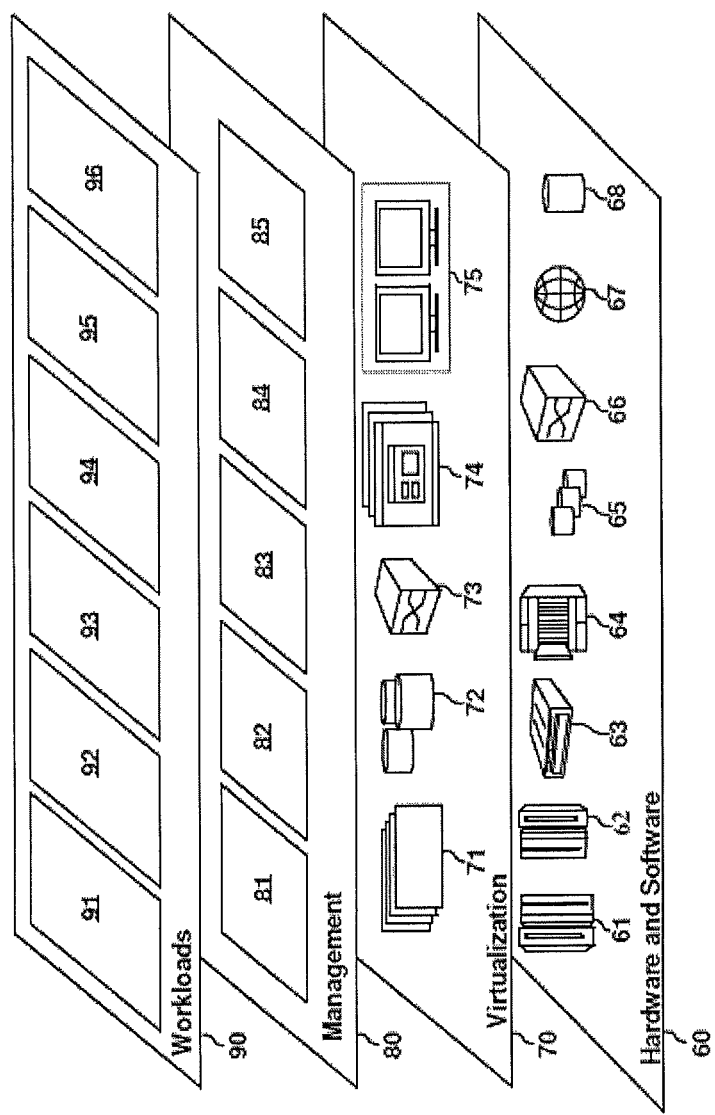
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 that provides for improved localized self-heating analysis during IC design primarily at the gate level in accordance with one or more embodiments of the present invention.

Figure 3:
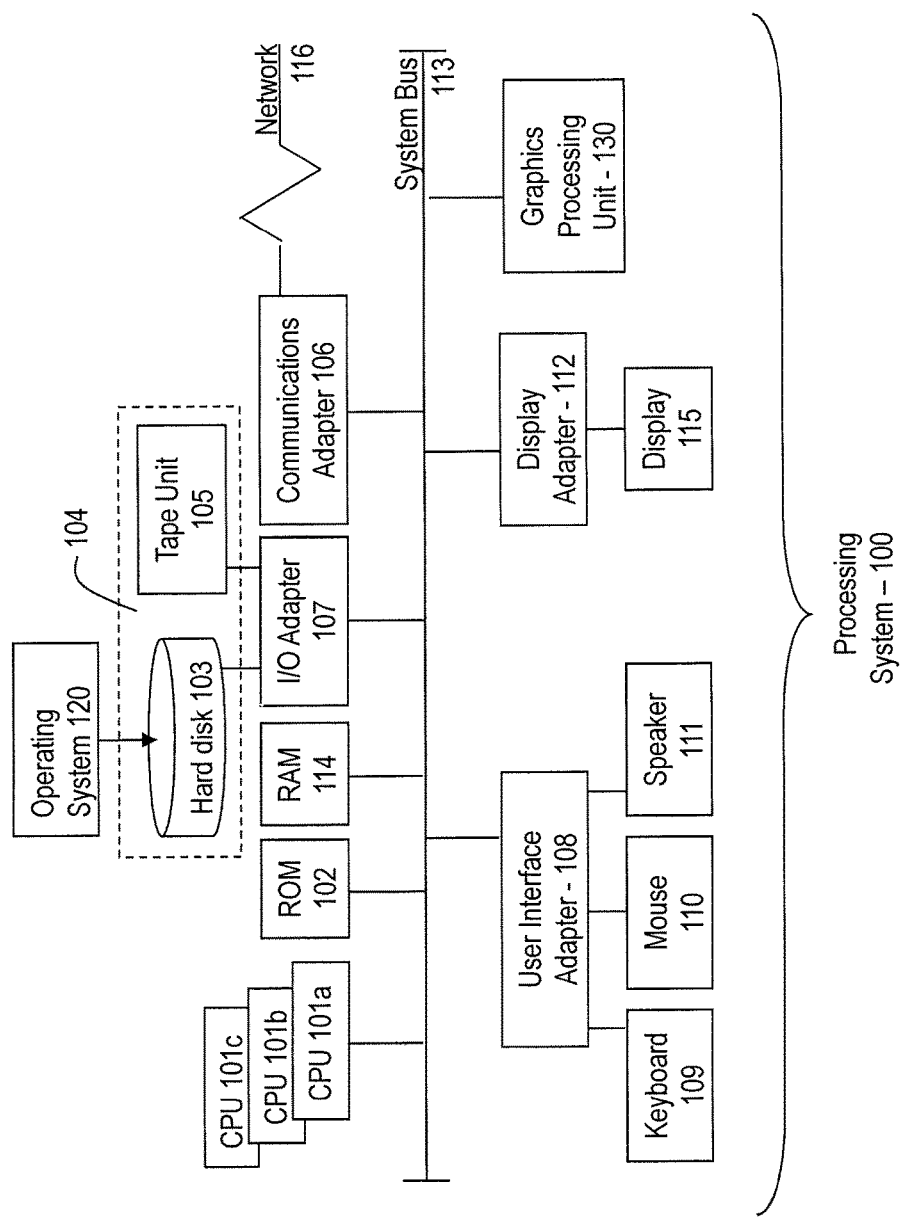
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113.

I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed that provide for improved localized self-heating analysis during IC design primarily at the gate level.

Figure 4:
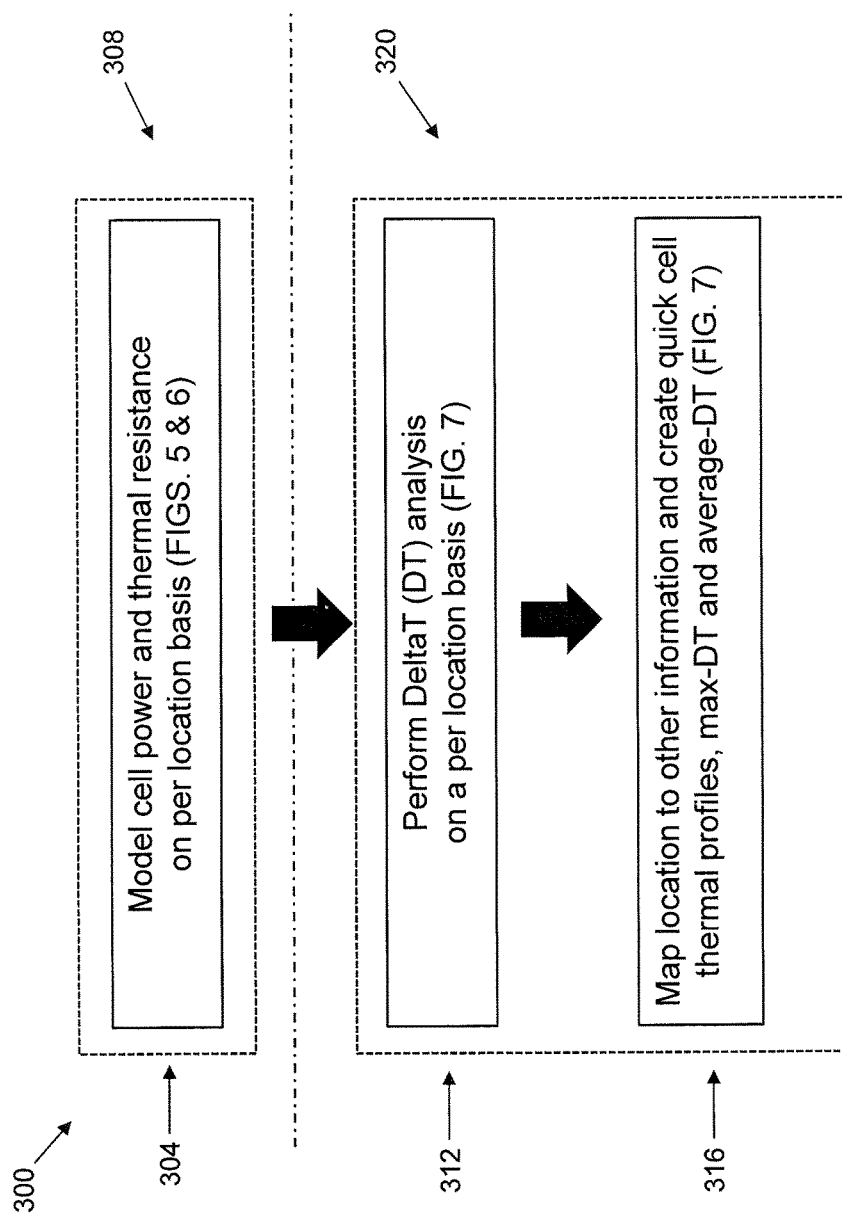
FIG. 4 is a flow diagram of a method for analysis of localized self-heating within an IC during the gate level design phase in accordance with one or more embodiments of the present invention.

Referring to FIG. 4, there illustrated is a flow diagram of a method 300 according to one or more embodiments of the present invention that provides for improved localized self-heating analysis during IC design primarily at the gate level, wherein the analysis accurately captures the heterogeneity of the self-heating or DeltaT within a cell of the IC in a relatively rapid and efficient "in-context" manner and relatively early in the IC gate level design flow process. As used herein, the "heterogeneity" of the self-heating or DeltaT of a cell refers to the overall self-heating or DeltaT value for a cell as typically being comprised of potentially widely varying values for temperature at different (transistor) locations within a single cell.

The in-context cell DeltaT analysis according to embodiments of the present invention is advantageous in that it captures any dependency of the localized self-heating or DeltaT on the workload of the cell being analyzed along with the dependency of the localized self-heating on the external load placed on the cell being analyzed. The workload is commonly considered to be the activity (e.g., transistor switching) of the particular cell being analyzed (e.g., a NAND gate). In turn, the external load placed on the particular cell being analyzed is commonly considered to be the load (e.g., capacitance) that the cell is driving. The localized self-heating or DeltaT of any cell within the IC is inherently dependent on the workload of the cell and the external load of the cell, among other factors. It follows that by reducing the workload of the cell and/or the load on the cell (e.g., by making design changes to the IC at the gate level), the localized self-heating or DeltaT can be reduced. This can be carried out by changing or selecting different cells from within a library of "standard" cells to be placed within the IC design instead of changing the structure of any one or more cells themselves.

Further, the workload and the external load can each vary relatively widely among various locations (e.g., x, y coordinates of transistors within a cell) in a cell depending upon where the cell is located and utilized in the overall functional design of the IC. As such, the corresponding temperatures associated with the various locations within a cell can also vary relatively widely. Thus, it is advantageous that the analysis of the self-heating of each cell be performed on a localized, "in-context" basis, as is with embodiments of the present invention. Further, the heterogeneity of the self-heating or DeltaT of the cell captures the overall self-heating or DeltaT value for that cell.

Modern ICs are typically designed in a hierarchical manner. For example, there may be an upper unit level in the IC design process, followed by a lower, more detailed gate level design process, which itself is followed by an even lower and more detailed transistor level design process. Embodiments of the present invention are primarily concerned with (but not necessarily limited to) the gate level of the IC design process.

In one or more embodiments of the present invention, the method 300 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment now known or hereinafter created.

In the method 300 of the flow diagram of FIG. 4, an operation in block 304 models the cell power and thermal resistance on a per location basis within each cell in the library of cells. This operation 304 produces a parameterized model for each cell or location with each cell. As discussed above, each location within a cell may comprise the x, y coordinates of one or more transistors within a cell, or the location may represent the x, y coordinates of the entire cell itself. Also, there may be hundreds or even a thousand or more cells in the library of cells. As such, this modeling operation 304 may be carried out for each one of the cells in the library of cells in accordance with embodiments of the present invention. In the alternative, the modeling operation 304 may be carried out for those cells that are likely to be used during the design of the IC, which results in a relatively smaller number of cells (e.g., 50) being modeled in this operation 304.

According to embodiments of the present invention, this modeling operation 304 may be performed "off line" in a transistor level modeling phase 308 of the overall IC design process (that is, not during the primary gate level design operations of the IC design process and not during the "analysis" operations of embodiments of the present invention). Also, the various operations that comprise this modeling operation 304 are described and illustrated in more detail hereinafter in conjunction with the flow diagrams of FIGS. 5 and 6.

In contrast, the remaining operations in blocks 312 and 316 may be performed in a gate level design and analysis phase 320 of the overall IC design process. The operation in block 312 comprises performing a self-heating or DeltaT (DT) analysis on a per location basis within each cell. In turn, the operation in block 316 comprises mapping a location within a cell to other information and creating quick cell thermal profiles, max-DT values, and average-DT values. The more detailed operations that comprise these operations 312, 316 are described and illustrated in greater detail hereinafter in conjunction with the flow diagram of FIG. 7.

Figure 5:
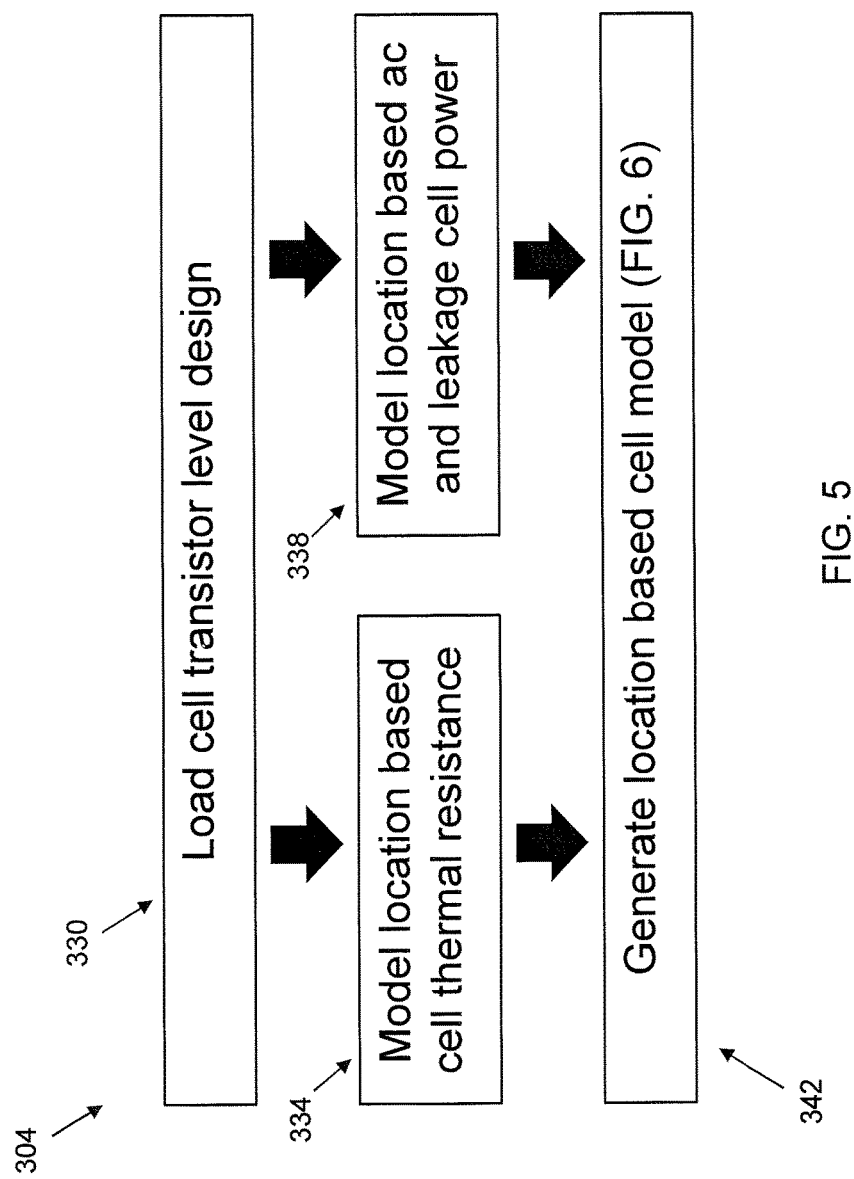
FIG. 5 is a more detailed flow diagram of a particular portion of the method of the flow diagram of FIG. 4 in accordance with one or more embodiments of the present invention.

Referring to FIG. 5, there illustrated is a more detailed flow diagram of the modeling operation in block 304 of the method 300 of the flow diagram of FIG. 4 in accordance with one or more embodiments of the present invention. In an operation in block 330, a particular one of the many cells in the library is loaded or selected for use by the IC designer. Specifically, the IC designer has access to the transistor level design of the selected cell.

In an operation in block 334, the location based thermal resistance RTH of the selected cell is modeled. The thermal resistance value may be characterized by computing or determining the effective thermal resistance from the schematic or layout of the selected standard cell and considering the topology of the cell and, for example, the transistor finger and fin count. More specifically, the thermal resistance value may be determined as a constant (degrees C./Watts) between the IC device temperature increase and the dissipated power. Alternatively, DeltaT equals RTH times Current or Power. That is, DeltaT is proportional to the dissipated power with a proportionality constant of RTH. It follows that the thermal conductivity or thermal conductance value, GTH, equals the inverse of the thermal resistance value (i.e., GTH=1/RTH). The RTH as characterized or modeled may be stored in the power rule for the selected standard cell.

An operation in block 338 may be run in parallel with the operation in block 334. The operation 338 may model the location based AC power and the leakage cell power for the selected cell.

Following the operations in blocks 334, 338, an operation in block 342 may generate the location based cell model. Each one of the plurality of cells in the library utilized by the IC designer may have a location based model generated for itself by this operation in block 342. This is described in more detail with respect to the flow diagram of FIG. 6.

Figure 6:
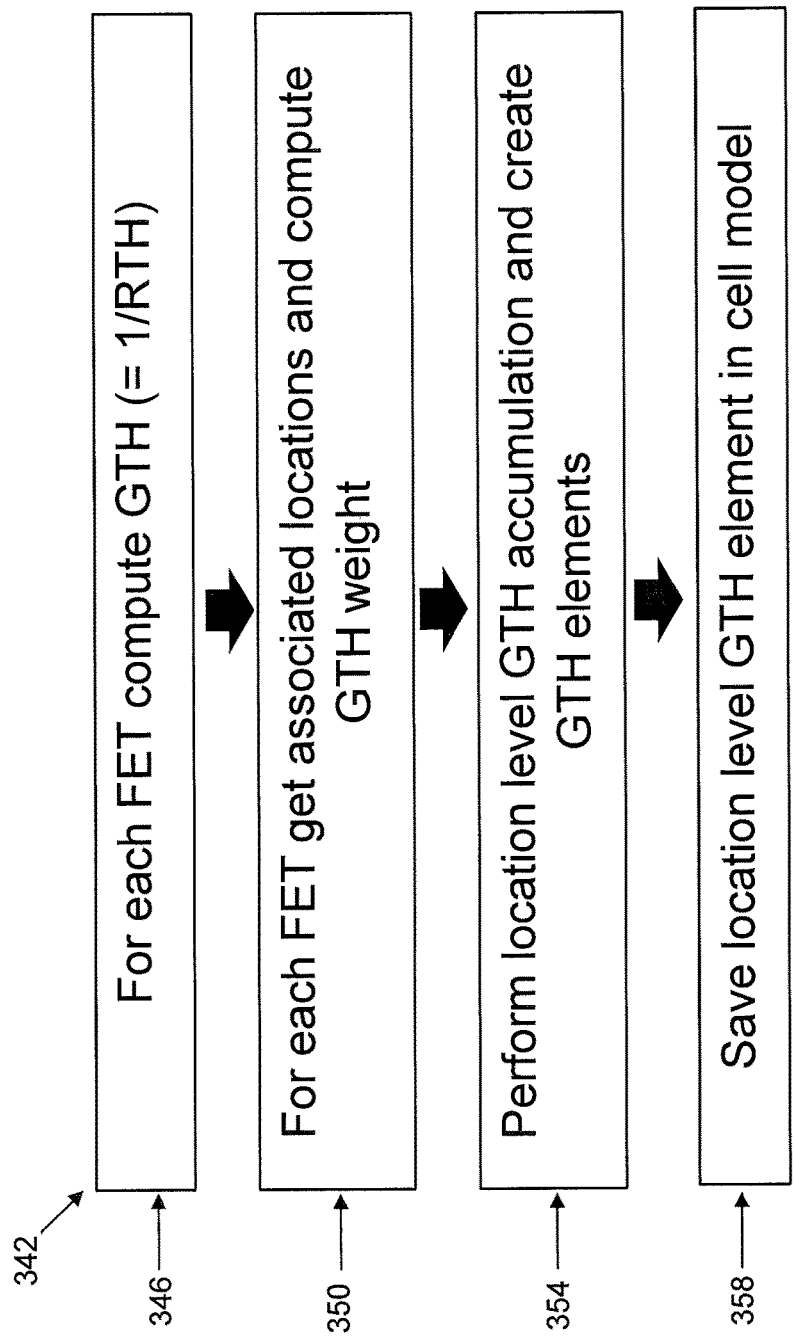
FIG. 6 is a more detailed flow diagram of the particular portion of the flow diagram of FIG. 5, which is a portion of the method of the flow diagram of FIG. 4, in accordance with one or more embodiments of the present invention.

Referring to FIG. 6, an operation in block 346 computes or determines the conductance value, GTH, for each transistor (e.g., field effect transistor or FET) in the selected cell. As disclosed hereinabove, GTH equals 1/RTH.

Next, an operation in block 350 obtains or gets the associated locations for each FET or transistor and computes or determines the thermal conductance (GTH) weight for each such location. Besides a location being the x, y coordinates of a cell or transistors within a cell, a location may be considered to be a contact within a cell in which current flows from a power source into the cell. As such, sometimes a location is typically referred to as a "CA."

An operation in block 354 then performs location level GTH accumulation and creates thermal conductance (GTH)

elements. The result of this operation in block 354 is a generated location based conductance value for the selected standard cell. Finally, the generated location level GTH elements or values are stored in the cell model in an operation in block 358.

Figure 7:
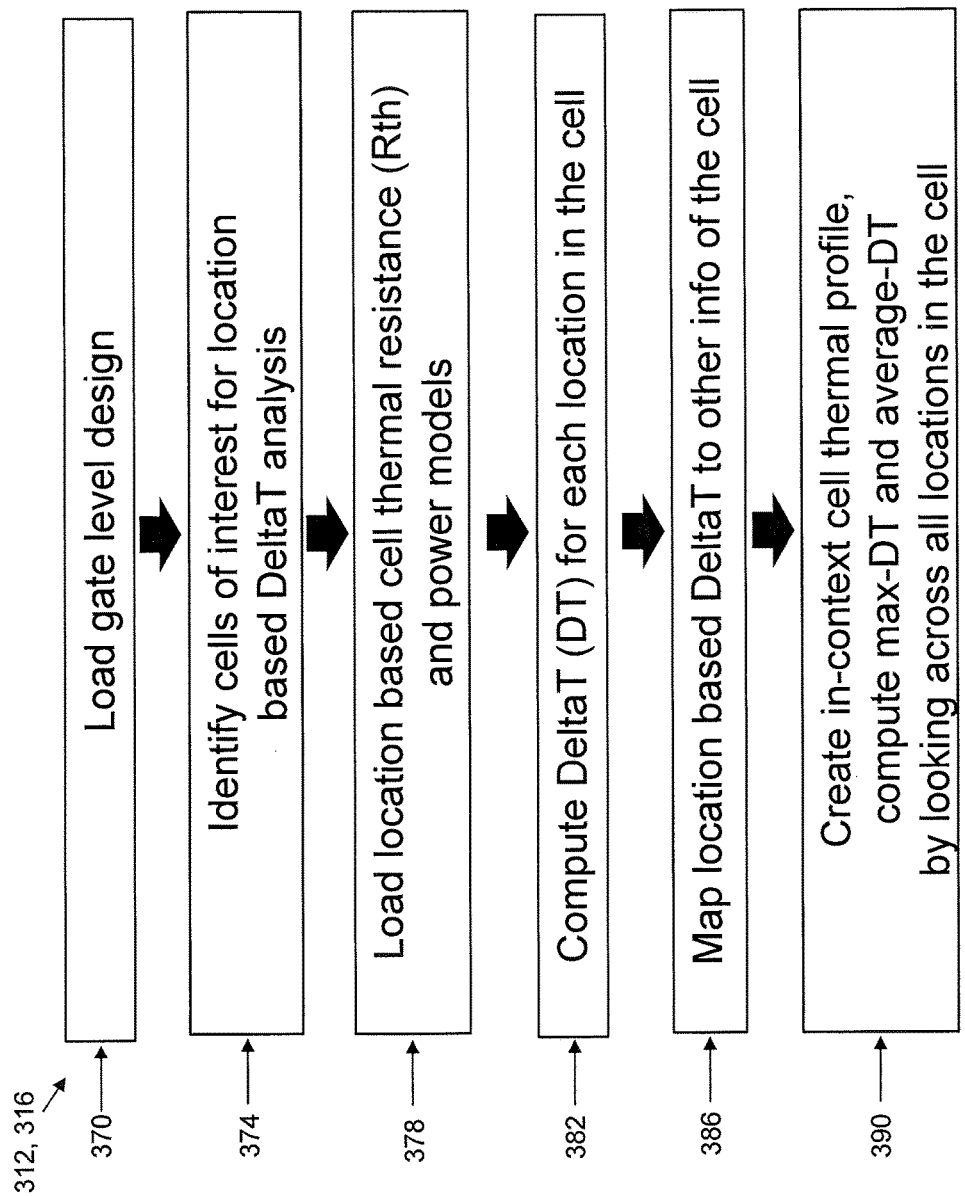
FIG. 7 is a more detailed flow diagram of a particular portion of the method of the flow diagram of FIG. 4 in accordance with one or more embodiments of the present invention.

Referring to FIG. 7, there illustrated is a more detailed flow diagram of the DeltaT analysis operation 312 and the mapping operation 316 of the method 300 of the flow diagram of FIG. 4 in accordance with one or more embodiments of the present invention. The operations in the flow diagram of FIG. 7 basically perform an in-context workload analysis and external load analysis of the location based cell model generated in the operation in block 342 of the flow diagram of FIG. 5.

In an operation in block 370, the gate level design is loaded for the IC design user. An operation in block 374 identifies cells of interest for location based self-heating or DeltaT analysis. This operation may be performed on all of the cells (e.g., one thousand or more cells) in the library or only on a subset (e.g., 50 cells) of cells of interest in the library. The cells of interest may be selected based on various criteria, including, for example, size, complexity, user input, etc.

An operation in block 378 loads the pre-characterized location based thermal resistance and power contributor models for the selected cells of interest. These models were determined or generated in the operation in the block 304 of the flow diagram of FIG. 4 as well as the more detailed flow diagrams of FIGS. 5 and 6. Also provided in this operation in block 378 may be process parameters (e.g., a relatively faster operating IC consumes more power and vice versa), voltage parameters (e.g., the operating voltage of the IC), and temperature parameters (e.g., ambient temperature).

An operation in block 382 computes or determines the amount or value of self-heating or DeltaT for each location in the cell. This may be performed using the location based thermal resistance and power models that were loaded in the operation in block 378. Next, an operation in block 386 maps the determined location based DeltaT values to other information in each cell.

Finally, an operation in block 390 creates an in-context cell thermal profile, computes or determines the max-DeltaT (DT) and average-DT values, for example, by looking across all locations within each cell. This type of heterogeneity analysis results in a relatively accurate location based thermal profile for the entire (macro) cell. If the IC designer utilizing embodiments of the present invention finds any of the information regarding the self-heating or DeltaT for a particular cell to be unacceptable (as given by the thermal profile of the cell), the designer may perform a re-design of the relevant portion of the IC using a different one or more cells.

Figure 8:
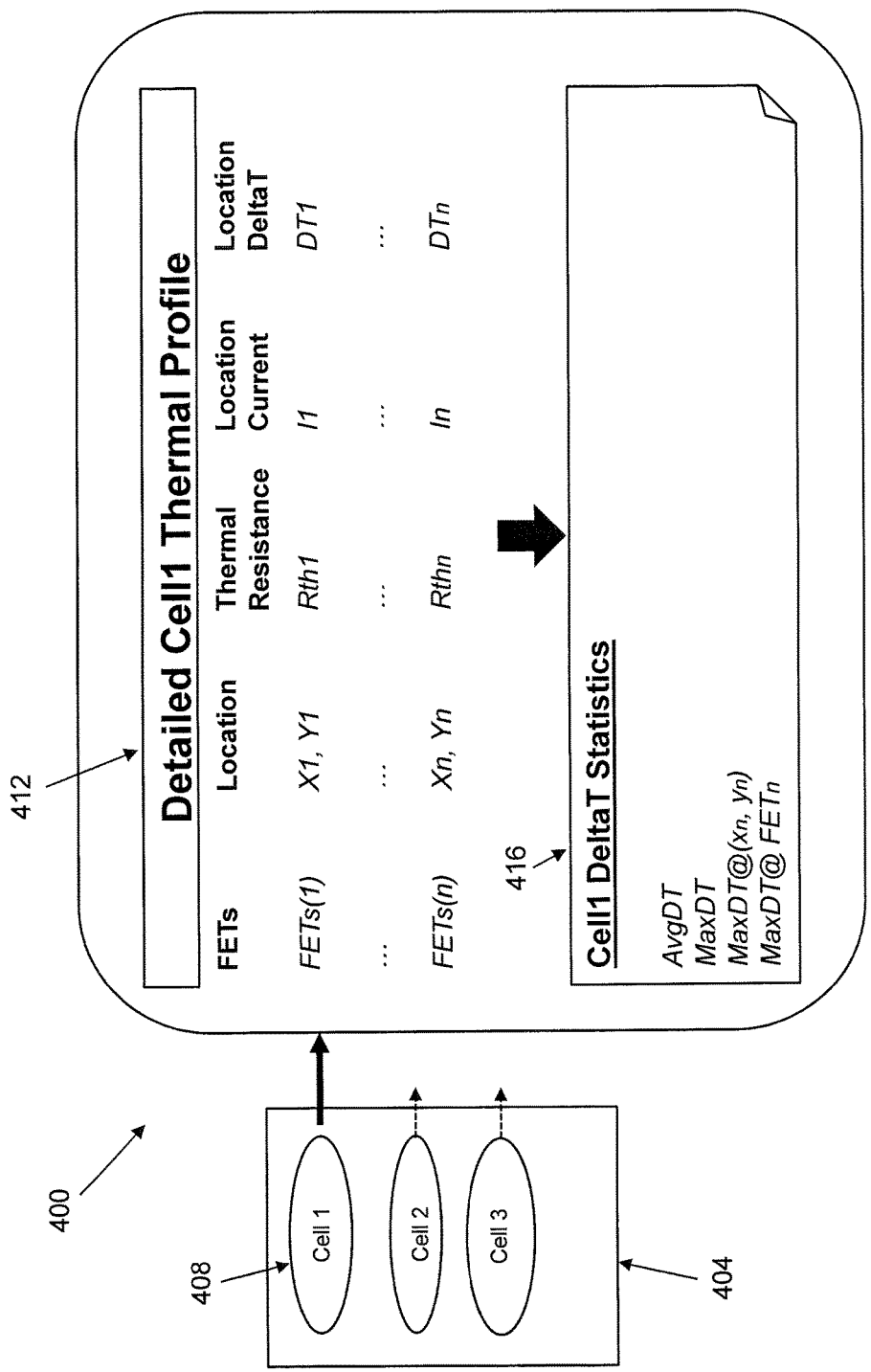
FIG. 8 is a visual illustration of various cell parameters determined by the method of the flow diagrams of FIGS. 4-7 as a result of the analysis of localized self-heating within an IC in accordance with one or more embodiments of the present invention.

Referring to FIG. 8, there is a visual illustration 400 of various cell parameters determined by the method of the flow diagrams of FIGS. 4-7 as a result of the analysis of localized self-heating within an IC in accordance with one or more embodiments of the present invention. This visual illustration 400 may be presented to the IC designer on a visual display screen, such as one that is part of one of the computing nodes in the cloud computing environment 50 of FIGS. 1 and 2, or the display monitor 115 that is part of the processing system 100 of FIG. 3, or on some other type of display screen associated with a computing or processing environment.

The visual illustration 400 may comprise an illustration of a macro gate 404 that contains three cells or cell instances, including a first cell 408. As the method of the flow diagrams of FIGS. 4-7 in accordance with embodiments of the present invention is utilized by an IC designer, a Detailed Cell Thermal Profile 412 visual display area is provided. In the exemplary embodiment of FIG. 8, the profile is with respect to Cell 1. However, each cell may have its profile displayed, typically in turn or in sequence as the analysis of DeltaT proceeds in accordance with embodiments of the present invention on a cell-by-cell basis. This display of the profile 412 gives the IC designer the "look and feel" of the data and modeling analysis of embodiments of the present invention.

Shown in the visual display area 412 of FIG. 8 are the n number of transistors or FETs (FETs(1)-FETs(n)), together with the location (e.g., in x, y coordinates) of each FET within Cell, the thermal resistance value (RTH) for each FET at each location, the electrical current value (I) for each FET at each location, and the value of DeltaT for each FET at each location. The value for DeltaT may be determined as the value for RTH times the value for I (i.e., DT1=RTH 1×I1). This provides the IC designer with detailed information about the self-heating or DeltaT for each FET within a cell.

The visual illustration 400 may comprise a visual display area 416 that comprises a display of various statistics of the DeltaT or self-heating of Cell 1 (i.e., the current cell being displayed in the visual illustration 400). These statistics may include, for example, the average-DT value, the max-DT value, the max-DT at a particular x, y coordinate value location, and the max-DT of a particular FET. These various values were computed or determined as disclosed hereinabove. Other self-heating or DeltaT parameter values may be displayed within the visual illustration, in light of the teachings herein.

Embodiments of the present invention enable the relatively efficient and accurate hierarchical self-heating analysis of an IC during the IC design process, particularly at the gate level of the design. This is performed, for example, by capturing the heterogeneity of the DeltaT within a cell while performing in-context cell DeltaT analysis. The in-context cell analysis provides the IC designer with a relatively more detailed view or picture of the cell being designed. Embodiments are also performed within acceptable turn-around times during the IC design process, due primarily to the relative efficiency of embodiments of the present invention. Embodiments also enable the self-heating analysis of workload exploration, and enable the efficient DeltaT mitigation of localized hot spots early on in the IC design process flow.

In addition, embodiments of the present invention also provide for improved efficiency in carrying out the DeltaT analysis, as compared to prior art circuit simulator and solver based techniques. That is, it is not uncommon for such prior art techniques to take hours or even days to run and provide their output analysis with respect to an IC design. In contrast, embodiments of the present invention may only add no more than 5% of the time to the overall IC design process. Thus, the turnaround time (or impact percentage) for embodiments of the present invention is very acceptable within typical IC design techniques.

Further, embodiments of the present invention are scalable, whereas prior art solver based techniques are typically not scalable. In addition, embodiments enable in-context workload driven DeltaT analysis, whereas prior art solver based techniques do not. That is, embodiments capture the heterogeneity of the DeltaT within the cell along with the maximum value of DeltaT within the cell and associated transistors. As a result, prior art solver based techniques are typically not usable in gate level analysis during the IC design process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a processor in communication with one or more types of memory, the processor configured to perform a method of fabricating a semiconductor device in which the processor is configured to:
    model a power characteristic and a thermal resistance characteristic for each one of a plurality of locations within a cell that is being designed into an integrated circuit;
    perform a self-heating analysis to determine an amount of heat at each one of the plurality of locations within the cell that is being designed into the integrated circuit; and
    create a thermal profile for the cell that is being designed into the integrated circuit, wherein the thermal profile includes a maximum self-heating value for each of the plurality of locations within the cell that is being designed into the integrated circuit and includes an average self-heating value for the cell that is being designed into the integrated circuit, and wherein the maximum self-heating value and the average self-heating value are derived from the determined amount of heat at each one of the plurality of locations within the cell, wherein the processor is configured to repeat the model, perform and create steps for each one of a certain number of cells within a library of cells that are being designed into an integrated circuit.

2. The system of claim 1 wherein each one of the plurality of locations within a cell that is being designed into an integrated circuit comprises one or more transistors.

3. The system of claim 2 wherein the processor configured to model the thermal resistance characteristic comprises the processor configured to determine a conductance value for each of the one or more transistors.

4. The system of claim 1 wherein the processor configured to model a power characteristic and a thermal resistance characteristic comprises the processor configured to model a power characteristic and a thermal resistance characteristic offline during a transistor level design phase of an integrated circuit design process.

5. The system of claim 1 wherein the processor configured to perform a self-heating analysis and to create a thermal profile comprises the processor configured to perform a self-heating analysis and to create a thermal profile during a gate level design phase of an integrated circuit design process.

6. The system of claim 1 the processor further configured to provide a visual display of the power characteristic, the thermal resistance characteristic, and the determined amount of heat at each one of the plurality of locations within the cell that is being designed into the integrated circuit.

7. A computer program product comprising:
    a storage medium readable by a processing circuit and storing instructions for execution by the processing circuit for performing a method of fabricating a semiconductor device comprising:
    modeling a power characteristic and a thermal resistance characteristic for each one of a plurality of locations within a cell that is being designed into an integrated circuit;
    performing a self-heating analysis to determine an amount of heat at each one of the plurality of locations within the cell that is being designed into the integrated circuit; and
    creating a thermal profile for the cell that is being designed into the integrated circuit, wherein the thermal profile includes a maximum self-heating value for each of the plurality of locations within the cell that is being designed into the integrated circuit and includes an average self-heating value for the cell that is being designed into the integrated circuit, and wherein the maximum self-heating value and the average self-heating value are derived from the determined amount of heat at each one of the plurality of locations within the cell, wherein the method is repeated for each one of a certain number of cells within a library of cells that are being designed into an integrated circuit.

8. The computer program product of claim 7 wherein each one of the plurality of locations within a cell that is being designed into an integrated circuit comprises one or more transistors.

9. The computer program product of claim 8 wherein modeling the thermal resistance characteristic comprises determining a conductance value for each of the one or more transistors.

10. The computer program product of claim 7 wherein modeling a power characteristic and a thermal resistance characteristic is performed offline during an transistor level design phase of an integrated circuit design process.

11. The computer program product of claim 7 wherein performing a self-heating analysis and creating a thermal profile are performed during a gate level design phase of an integrated circuit design process.

* * * * *